(12) United States Patent
Babu et al.

(10) Patent No.: US 7,844,501 B2
(45) Date of Patent: Nov. 30, 2010

(54) INTERFACES BETWEEN ENTERPRISE CUSTOMERS AND SUPPLIERS

(75) Inventors: Suresh R. Babu, Los Altos, CA (US); Youneng Xiao, Shanghai (CN); Jie Zhao, Shanghai (CN); Christiane Kuntz-Mayr, Limburgerhof (DE); Heinz Kagermann, Reilingen (DE); Ramshankar Venkatasubramanian, Santa Clara, CA (US)

(73) Assignee: SAP AG, Walldorf (DE)

( * ) Notice: Subject to any disclaimer, the term of this patent is extended or adjusted under 35 U.S.C. 154(b) by 1192 days.

(21) Appl. No.: 11/475,322

(22) Filed: Jun. 26, 2006

(65) Prior Publication Data

US 2007/0027740 A1 Feb. 1, 2007

Related U.S. Application Data

(63) Continuation-in-part of application No. 11/399,411, filed on Apr. 7, 2006, and a continuation-in-part of application No. 11/399,412, filed on Apr. 7, 2006.

(60) Provisional application No. 60/695,150, filed on Jun. 28, 2005.

(51) Int. Cl.
 *G06Q 30/00* (2006.01)
(52) U.S. Cl. .......................... 705/26; 705/27
(58) Field of Classification Search .............. 705/26, 705/27
 See application file for complete search history.

(56) References Cited

U.S. PATENT DOCUMENTS 6,199,068 B1 * 3/2001 Carpenter ............... 707/999.1
6,601,233 B1 * 7/2003 Underwood ............... 717/102
7,315,868 B1 * 1/2008 Turba ........................ 707/797
2002/0138316 A1 * 9/2002 Katz et al. .................... 705/7
2003/0125966 A1 * 7/2003 Viswanath et al. ........... 705/1
2004/0010496 A1 * 1/2004 Behrendt et al. ........... 707/10
2004/0015408 A1 * 1/2004 Rauen et al. ................ 705/26
2005/0044197 A1 * 2/2005 Lai ........................... 709/223
2009/0327105 A1 * 12/2009 Moussa et al. .............. 705/29

OTHER PUBLICATIONS

S. Damodaran, "B2B Integration Over the Internet with XML-RosettaNet Successes and Challenges," May 17-22, 2004, New York, NY, pp. 188-195.*

* cited by examiner

*Primary Examiner*—Jason Dunham
(74) *Attorney, Agent, or Firm*—Blakely Sokoloff Taylor & Zafman LLP (57) ABSTRACT

Methods and apparatuses for interfacing an enterprise customer with a supplier are described herein. In one embodiment, in response to a request received from an enterprise customer via a first interface (e.g., a common or universal interface) of a Web service over the Internet for a service provided by a supplier, processing logic is configured to map the request from a first format compatible with the first interface to a second format compatible with a second interface coupling with a backend system of the supplier. Processing logic invokes a method of the backend system of the supplier via the second interface (e.g., supplier specific interface) to provide the requested service to the enterprise customer using information of the mapped request. The first interface is compatible with the requesting customer and the second interface is a specific interface to the backend system of the supplier. Functionality of mapping and the second interface are maintained by the supplier. Other methods and apparatuses are also described.

17 Claims, 8 Drawing Sheets

```
class XCCFrameworkClass
{
        public:
                ...
                // Most common functions for a supplier
                ...
                XCCRSSResponse executeRSS (XCCRSSRequest);

// Other most common functions
                ...

```
class XCCConcreteClass : XCCFrameworkClass
{
        public:
                ...
                // Most common functions interfaces for a supplier
                // Inherited from the base class
                ...
                XCCRSSResponse executeRSS (XCCRSSRequest)
                {
                        Mapping between XCCRSSRequest and RSSRequest;

Call RSSService (RSSRequest);

Mapping between RSSResponse and XCCRSSResponse;

return XCCRSSResponse;
                }

// Other most common functions
                ...

private (or protected):
                ...
                // Supplier specific functions or interfaces
                ...
                RSSResponse RSSService (RSSRequest);

// Supplier other specific functions or interfaces
                ...
};
```

INTERFACES BETWEEN ENTERPRISE CUSTOMERS AND SUPPLIERS

RELATED APPLICATIONS

This application is a continuation-in-part (CIP) of co-pending U.S. patent application Ser. No. 11/399,411, filed Apr. 7, 2006, which claims the benefit of U.S. Provisional Application No. 60/695,150, filed Jun. 28, 2005. This application is a continuation-in-part (CIP) of co-pending U.S. patent application Ser. No. 11/399,412, filed Apr. 7, 2006, which claims the benefit of U.S. Provisional Application No. 60/695,150, filed Jun. 28, 2005. The disclosure of the above identified applications is expressly incorporated herein by reference to its entirety.

FIELD OF THE INVENTION

The present invention relates generally to the field of enterprise resource planning and management. More particularly, this invention relates to interfacing an enterprise customer with a supplier.

BACKGROUND

As the ERP (Enterprise resource planning) methodology has become more popular, software applications have emerged to help business managers implement ERP in business activities such as inventory control, order tracking, customer service, finance and human resources, etc.

For example, parcel shipping has grown to become an important mode of transportation and the industry continues to grow as enterprises and other shippers (e.g., enterprise customers) seek an increasing range of services from carriers (e.g., suppliers) to fulfill market requirements. By way of example, enterprises seek carriers that are able to integrate their transportation planning and execution processes, to implement business rules easily, to manage their business processes in exception mode(s), to track their shipping execution, and to complete the loop with an easy financial settlement. In addition, carriers are attempting to distinguish themselves by offering a wide variety of value added services, such as track & trace features and address validation.

There are many carriers providing parcel shipping services including, but is not limited to, ocean shipping and shipping by rail, etc. In order to improve efficiency and convenience to customers, most carriers provide application program interfaces (APIs) or web services so that ERP companies may integrate those services into their solutions. Some common carrier APIs or services mostly include rate and service selection (RSS), pick, pack, manifest and track, etc. For example, using an RSS service, customer may obtain a list of available products after providing parcel weight or ship-from and ship-to information, then the customer chooses one according to a specific requirement. For most carriers, the interfaces for RSS are different, so the major work of integrating a carrier's services into an ERP system is to implement the interface mapping (or message mapping) between the ERP system and the carrier's backend system.

Figure 1:
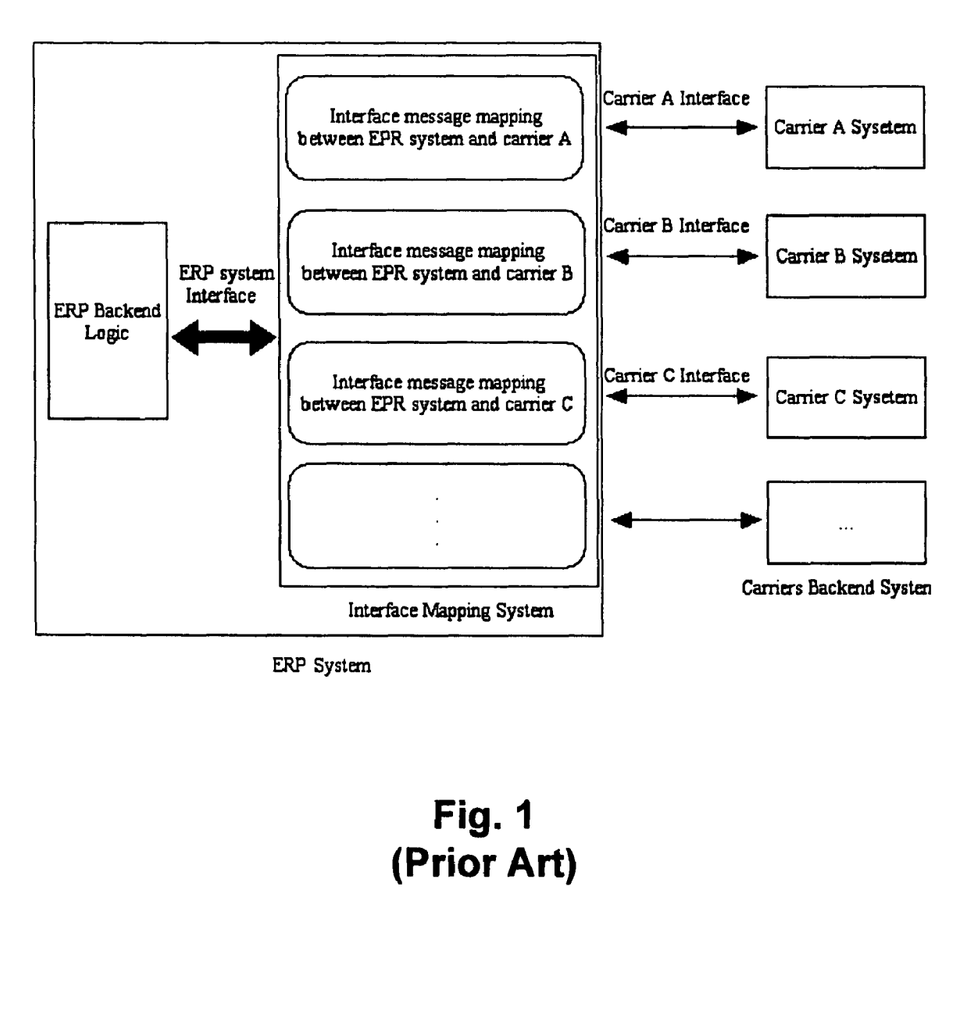
FIG. 1 is a block diagram illustrating a typical solution of integrating an ERP system and a backend system of a carrier.

FIG. 1 is a block diagram illustrating a typical solution of integrating an ERP system and a backend system of a carrier. Referring to FIG. 1, the interface mapping, which transforms a carrier's private interface into the ERP company's private interface, is located in the ERP system. That is to say, the ERP company will do the mapping. There is tight coupling between a carrier's backend system and an ERP system.

As a result, all interface mapping will be done by the ERP company, so it is impractical for the ERP company to integrate a large quantity of carriers because interface mapping is a heavy workload. Even if the ERP company only integrates several major carrier backend systems, the workloads are still relatively large. In addition, if one carrier changes its interface, the existing ERP system will not function.

Such an interface change would produce a serious problem if the ERP system has already released to its customers. The ERP company would need to update the interface mapping between the ERP's private interface and the carrier's new interface, and then publish the update as a patch to all customers. The ERP company would then notify each customer individually to install the new patch. If the ERP company has many customers, this would prove to be a time consuming task. Further, if the ERP company integrates hundreds of carrier backend systems into the ERP system, the ERP company would need to update the ERP system more often, even if one carrier only updates its interface on occasion. Customers would then need to install ERP system patches more frequently.

SUMMARY OF THE DESCRIPTION

Methods and apparatuses for interfacing an enterprise customer with a supplier are described herein. In one embodiment, in response to a request received from an enterprise customer via a first interface (e.g., a common or universal interface) of a Web service over the Internet for a service provided by a supplier, processing logic is configured to map the request from a first format compatible with the first interface to a second format compatible with a second interface coupling with a backend system of the supplier. Processing logic invokes a method of the backend system of the supplier via the second interface (e.g., supplier specific interface) to provide the requested service to the enterprise customer using information of the mapped request. The first interface is compatible with the requesting customer and the second interface is a specific interface to the backend system of the supplier. Functionality of mapping and the second interface are maintained by the supplier.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Methods and apparatuses for interfacing enterprise customers and suppliers are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a supplier connect unit is designed and implemented to interface an enterprise customer (e.g., an ERP system) and a supplier. The supplier connect unit includes a first interface to interface with one or more enterprise customers and a second interface to interface with a backend system of a supplier. In one embodiment, the first interface is defined and maintained by an ERP system, such as a developer or an administrator of the ERP system, which may be deployed to one or more of the enterprise customers. That is, multiple enterprise customers accessing a supplier may utilize the first interface, also referred to as a universal interface, to access the supplier.

The second interface of the supplier connect is designed to be specifically tailored to a specific interface required by the backend system of the supplier. The second interface may be maintained by the supplier. In one embodiment, the supplier connect unit further includes a mapping mechanism to map any communications between an enterprise customer with the respective supplier (e.g., between the first and second interfaces or vice versa). In one embodiment, the mapping mechanism is also maintained by the supplier. As a result, any changes of the second interface by the supplier will not have significant impact on the first interface as long as the mapping mechanism can handle the mapping between the existing first interface and the updated second interface.

Thus, an enterprise customer can interface with multiple suppliers using substantially the same interface (e.g., the first interface or universal interface), even though some of the suppliers may have backend systems having different interfaces (e.g., different respective second interfaces), where each of the suppliers is responsible for mapping the first interface with its respective second interface. With the help of a supplier connect unit, an ERP system and a supplier's backend system can be connected seamlessly.

By way of examples, a supplier may be a carrier handling parcel shipping for an enterprise customer, where an enterprise customer may utilize services of multiple carriers via the first interface and some of the carriers may have different backend systems (e.g., different second interfaces). Throughout this application, a carrier is used as an example of a supplier for the purposes of illustration. However, it is not so limited, other entities, such as, for example, online retailers may also be applied.

Figure 2A:
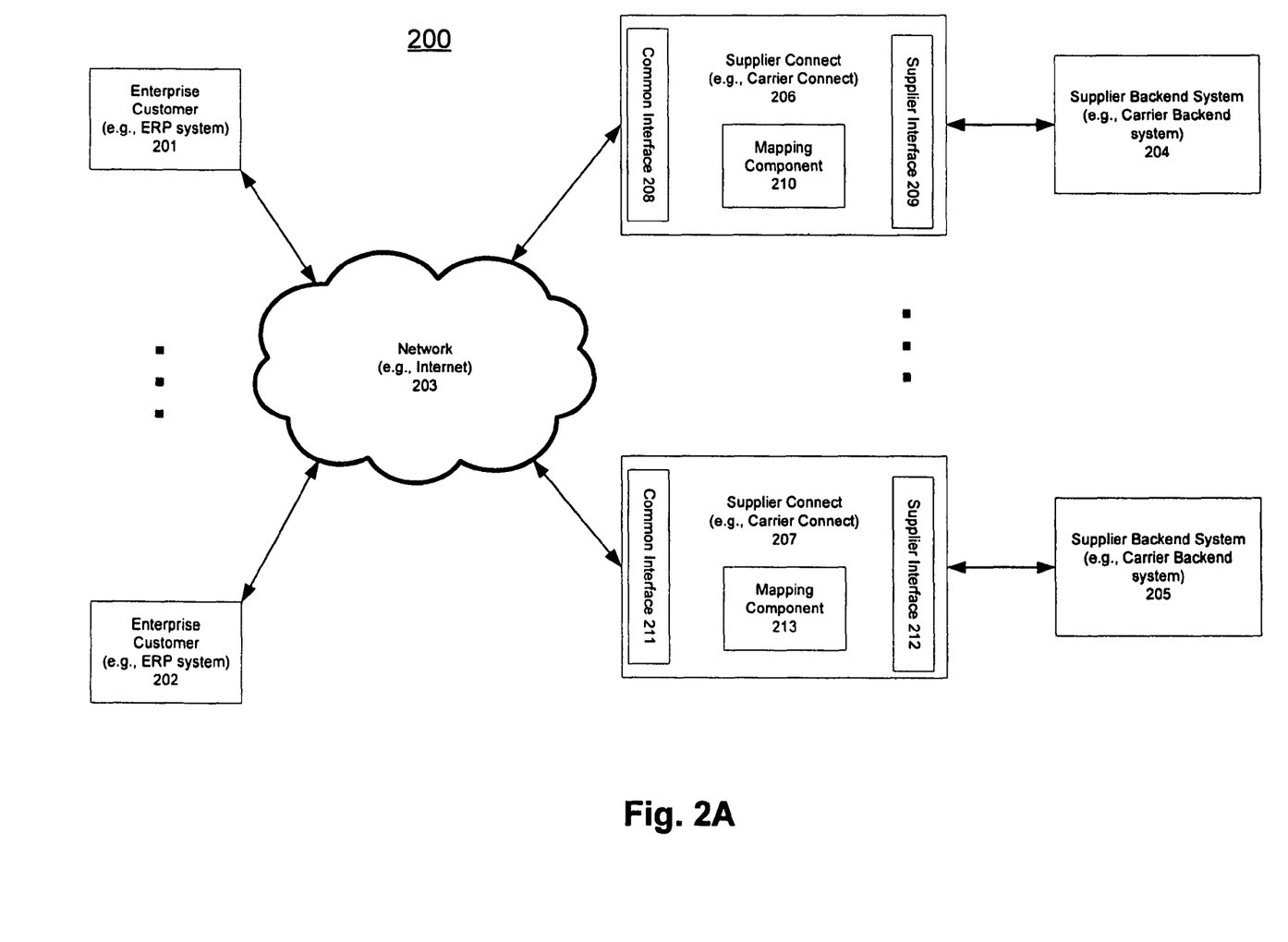
FIGS. 2A and 2B are block diagrams illustrating examples of a system interfacing an enterprise customer with a supplier according to certain embodiments of the invention.

FIG. 2A is a block diagram illustrating an example of a system interfacing an enterprise customer with a supplier according to one embodiment of the invention. Referring to FIG. 2A, according to one embodiment, system 200 includes, but is not limited to, one or more enterprise customers 201-202 using an ERP system accessing one or more services provided by one or more suppliers 204-205 over a network 203 (e.g., Internet). In addition, for each of the suppliers 204-205, there is a supplier connect, such as supplier connects 206-207, respectively for interfacing the respective supplier with one or more of the enterprise customers 201-202.

For example, according to one embodiment, supplier connect 206 is associated with supplier 204 and is responsible for interfacing supplier 204 with one or more of the enterprise customers 201-202. Likewise, supplier connect 207 is associated with supplier 205 and is responsible for interfacing supplier 205 with one or more of the enterprise customers 201-202.

According to one embodiment, each supplier connect includes a first interface (e.g., a common or universal interface) coupled to one or more enterprise customers and a second interface coupled to a backend system of the associated supplier. For the purposes of illustration, for example, supplier connect 206 includes a first interface 208 for interfacing with one or more enterprise customers 201-202 over the network 203, which may be a publicly accessible network such as the Internet. Supplier connect 206 further includes a second interface that is specifically designed to interface with a specific implementation of the associated backend system of supplier 204. Since the first interface 208 may be different than the second interface 209, supplier connect 206 further includes a mapping mechanism or component 210 responsible for mapping the communications between different interfaces 208 and 209.

In one embodiment, the first interface 208 may be designed and maintained by an ERP designer associated with one or more enterprise customers 201-202, while the second interface 209, and/or the mapping component 210, may be maintained by the supplier 204. For example, supplier connect 206 may be implemented as part of a Web server associated with the backend system 204 of a supplier. Alternatively, supplier connect 206 may be maintained by a third party entity different than a supplier entity associated with the backend system 204.

During the operations, according to one embodiment, when a request is received at the first interface 208 of supplier connect 206 for accessing a service provided by the supplier 204, the mapping component 210 is configured to map the request from a first format compatible with the first interface 208 to a second format compatible with the second interface 209. Thereafter, the supplier connect 206 invokes a method of supplier backend system 204 via the second interface 209 to provide the requested service.

In response to a result of the invocation of the method of backend system 204, according to one embodiment, the mapping mechanism 210 is configured map the result of invocation of the method from a format compatible with the second interface 209 back to the first interface 208, and to return the mapped response back to the requesting enterprise customer via the first interface 208.

Likewise, the supplier connect 207 operates in a manner similar to those with respect to supplier connect 206. In this case, supplier connect 207 is responsible for interfacing supplier 205 with one or more enterprise customers 201-202 over the network 203. Similar to supplier connect 206, supplier connect 207 includes a first interface 211, a second interface 212, and a mapping mechanism 213 for mapping communications between the first and second interfaces 211-212. In one embodiment, the interface 211 is substantially identical to interface 208 of supplier connect 206. However, the interface 212 may be different than interface 209 of supplier 206 dependent upon the specific design of the backend system 205.

As a result, an enterprise customer (e.g., any one of enterprise customers 201-202) may communicate and/or invoke a service from any one of suppliers 204-205 using a substantially identical request since the interfaces 208 and 211 are substantially the same, even though the specific designs or interfaces (e.g., interfaces 209 and 212) of suppliers 204-205 may be different. Other configurations may exist.

Note that configuration 200 of FIG. 2A is shown and described for the purposes of illustration only. Other configurations may be implemented differently. For example, as shown in FIG. 2B according to certain embodiments of the invention, some of the supplier connects may be implemented on the enterprise customer sides, while other supplier connects may be implemented on the supplier sides.

Figure 2B:
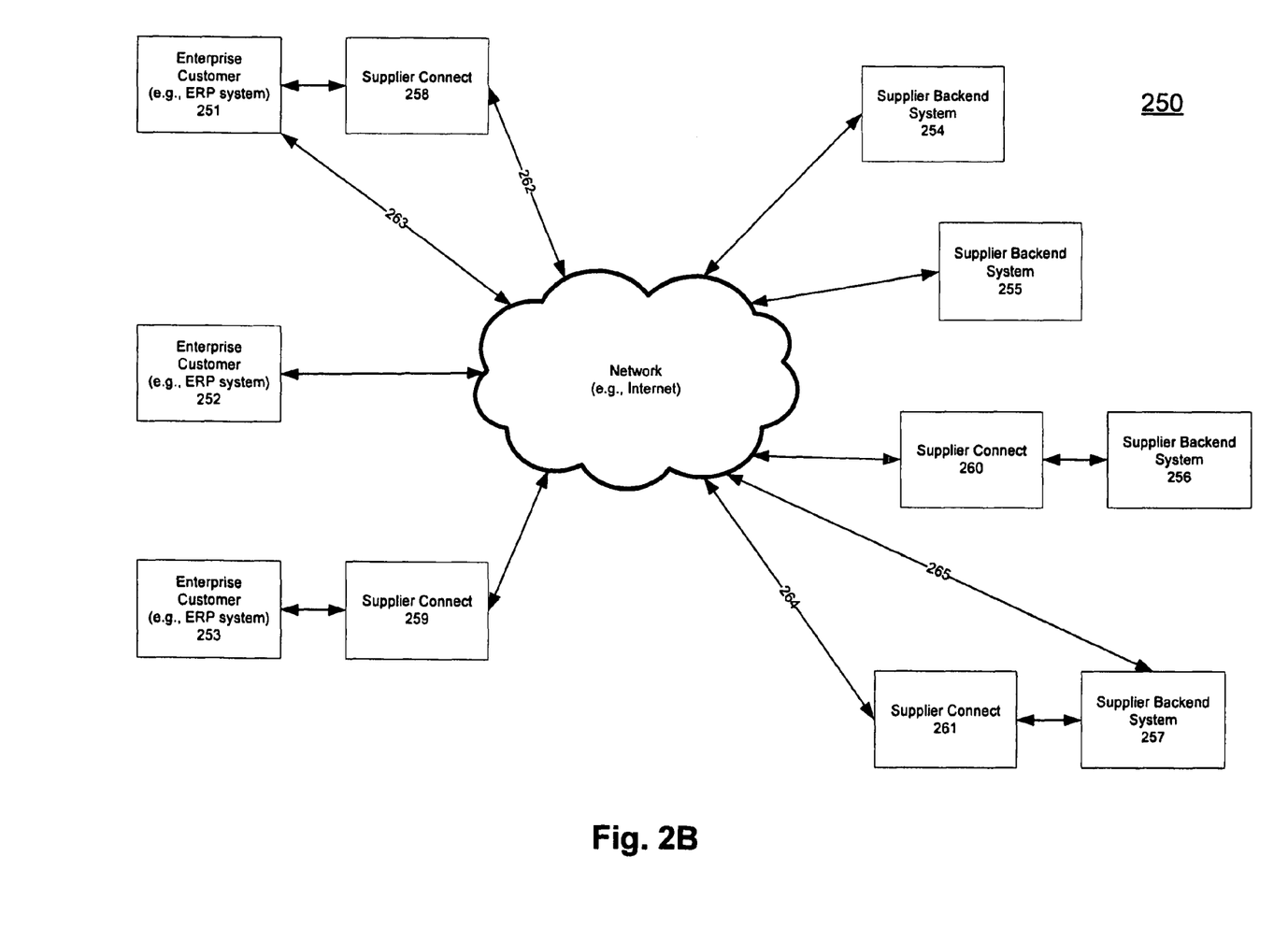

Referring to FIG. 2B, in this example, similar to configuration 200 of FIG. 2A, configuration 250 includes an enterprise customer 252 coupled to the network (e.g., Internet) to accessing supplier backend systems 256-257 via supplier connects 260-261 respectively, using some or all of the techniques set forth above, where supplier connects 260-261 are implemented at the supplier sides of suppliers 256-257. In addition, according to one embodiment, supplier connects 258-259 may be implemented on enterprise customer sides, in this example, enterprise customers 251-252 respectively. In this way, for example, enterprise customer 251 is responsible for maintaining the interfaces of supplier connect 258 (which in this case, may be referred to as a customer connect) published in the network to allow other suppliers such as suppliers 254-255 to provide services to enterprise customer 251, as long as suppliers 254-255 provide an interface compatible to the published interface of supplier connect 258. As a result, suppliers 254-255 are not responsible for maintaining the published interfaces, which sometimes are relatively expensive.

In addition, an enterprise customer may maintain a supplier connect on the enterprise customer side; while it is able to access a supplier connect maintained by a supplier. For example, enterprise customer 251 may maintain supplier connect 258 at its side to access supplier systems 254 and/or 255 via path 262. Meanwhile, enterprise customer 251 maintains another interface to access supplier connects 260 and/or 261 of suppliers 256 and/or 257 respectively. Similarly, a supplier system (e.g., supplier 257) may provide services to an enterprise customer using a supplier connect maintained at its side (e.g., supplier connect 261 via path 264), while it provides services to other enterprise customers having a supplier connect on the customer side (e.g., via path 265).

Furthermore, an enterprise customer having a supplier connect on customer side (e.g., enterprise customer 251 having supplier connect 258) may access a supplier system having a supplier connect on the supplier side (e.g., supplier 257 having supplier connect 261), as long as the interfaces are compatible to each other. It will be appreciated that other configurations apparent to one with ordinary skill in the art may also be implemented.

Figure 3:
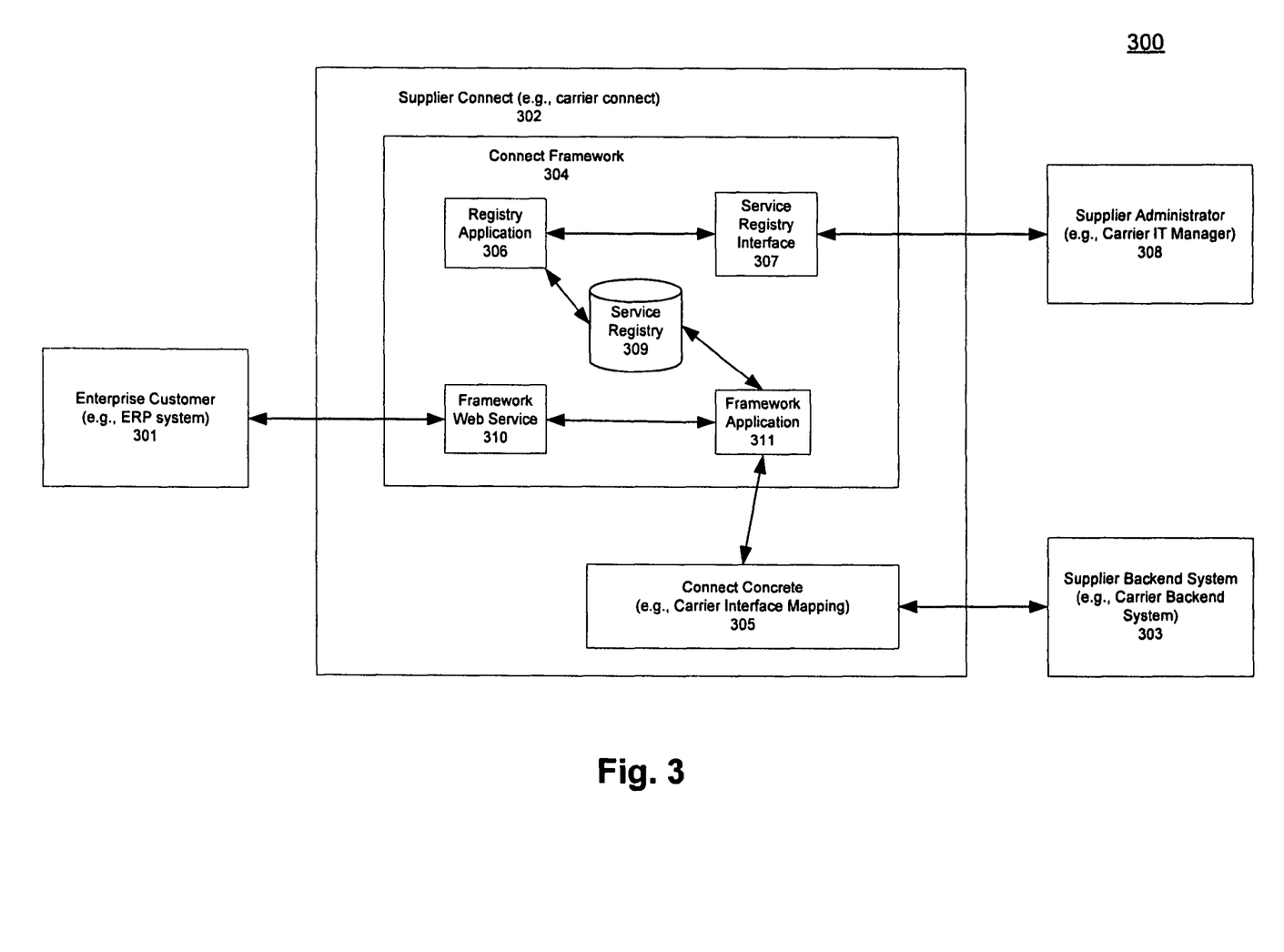
FIG. 3 is a block diagram illustrating an example of a supplier connect system according to one embodiment of the invention.

FIG. 3 is a block diagram illustrating an example of a supplier connect system according to one embodiment of the invention. Referring to FIG. 3, system 300 includes, but is not limited to, an enterprise customer or ERP system 301 coupled to a supplier backend system 303 via a supplier connect system 302. The enterprise customer 301 may be implemented as, for example, any one of the enterprise customers 201-202 of FIG. 2A. Supplier connect 302 may be implemented as any one of the supplier connects 206-207 of FIG. 2A and supplier backend 303 may be implemented as any one of the supplier backend systems 204-205 of FIG. 2A.

In one embodiment, supplier connect 302 includes a connect framework 304 and a connect concrete 305. The connect framework 304 is configured to provide a common or universal interface to allow one or more enterprise customers, such as enterprise customer 301, to access a service provided by a supplier backend system 303. The connect concrete 305 is responsible to process any business logic related to the supplier backend system 303, including mapping the communications between the common interface and the backend system specific interface (not shown), similar to the interfaces 209 and 212 of FIG. 2A.

As described above, according to one embodiment, supplier connect 302 may be implemented as part of a Web server associated with the backend system 303 of a supplier. Alternatively, supplier connect 302 may be maintained by a third party entity different than a supplier entity associated with the backend system 303. Furthermore, connect framework 304 and connect concrete 305 may be implemented at separate computing systems or servers. For example, connect framework 304 may be maintained by third party Web server, while connect concrete 305 may be implemented within a computing system or server associated with a supplier of the supplier backend system 303. Other configuration may also exist.

For the purposes of illustration only, a carrier is used as an example of a supplier. It will be appreciated that the techniques described in this application can be applied to other types of enterprise entities. Here, for the purposes of illustration, the supplier backend system 303 is referred to as a carrier; supplier connect 302 is referred to as an xCarrier connect; and enterprise customer 301 is referred to as an ERP system. In this example, xCarrier Connect (XCC) 302 includes XCC framework 304 and XCC concrete 305 having functionality similar to those described above.

In one embodiment, XCC framework 304 includes a register tool, also referred to as a registry application 306 to allow an administrator 308 of xCarrier 303 to register their services via a registry interface 307, which may be a Web interface or a command line interface. Suppose the xCarrier provides an RSS (rate and service selection) service in the backend system 303, and the xCarrier also provides the corresponding support in XCC concrete 305, then the xCarrier can register the RSS service into service registry 309 (e.g., a register table) via the register application 306, during the configuration phase of the XCC 302.

If the registered services are implemented in a Java environment, according to certain embodiments of the invention, the information stored in the service registry may include, but is not limited to, service name, vendor name, application name, Java archive (JAR) name, and/or Java naming and directory interface (JNDI), etc. However, other object oriented environments, such as, for example, the .NET framework available from Microsoft, may also be utilized.

According to one embodiment of the invention, in XCC framework 304, most common services for parcel shipping by a typical carrier, such as, for example, RSS, track, labeling and manifest, etc., are defined. For the purposes of illustration, an RSS service may be defined as follows:

XCCRSSResponse executeRSS (XCCRSSReqeust)

Figure 4A:
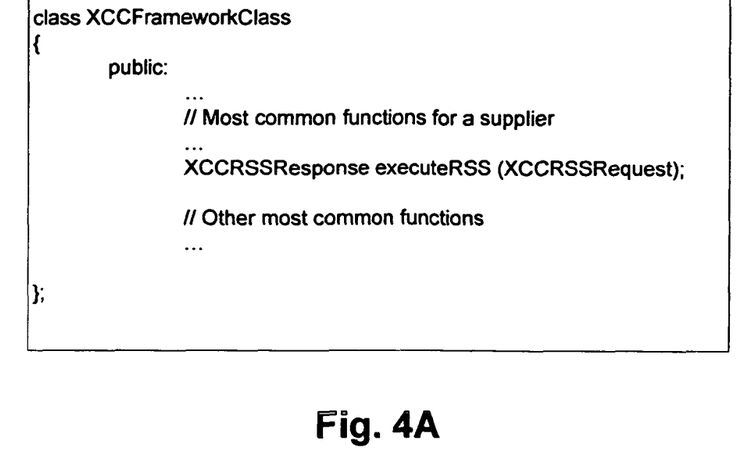
FIGS. 4A and 4B are examples of pseudo code for defining interfaces between a customer and a supplier according to certain embodiments of the invention.

Here XCCRSSReqeust is an input parameter and XCCRSSResponse is an output parameter. XCC framework may publish executeRSS as a method in a form of a web service 310, as illustrated in FIG. 4A, so that an ERP system (e.g., ERP system 301) can invoke the RSS service of carrier 303. In one embodiment, XCC framework 304 only defines the RSS service without implementing the carrier's business logic of RSS.

XCCRSSRequest and XCCRSSResponse constitute the interface between ERP system 301 and XCC 302. In one embodiment, this interface (e.g., message structures) may be defined by an ERP company or vendor that develops the ERP system used by the enterprise customer 301. The message may satisfy most carriers' RSS business process requirements, which implemented as part of a common or universal interface for the xCarrier connect framework 304 similar to those set forth above.

At run time, XCC framework 304 operates similar to a proxy between ERP system 301 and XCC concrete 305. When web service invocation of executeRSS from ERP system is received at framework Web service interface 310, according to the service name of the RSS service to be invoked, framework application 311 is configured to look up the service registry 309 to determine whether the RSS service has been registered in XCC framework 304. If the RSS service has been registered in XCC framework (e.g., information associated with the RSS is stored in the service registry 309), the framework application 311 is configured to look up the location information, such as, for example, name, application name, JAR name, and/or JNDI for RSS service in a Java environment. Based on the location information, the framework application 311 locates the XCC connect (e.g., an entry point to the corresponding method) and then calls the specific method in XCC concrete 305.

In one embodiment, the universal message structures (defining the Web service 310) may be defined before XCC is installed in the carrier side and may be maintained by the ERP company or vendor. The service registry 309 may be managed and maintained by the carrier (e.g., carrier 303) and/or managed by its administrator or IT manager (e.g., administrator 308).

In one embodiment, xCarrier connect concrete 305 may be implemented and maintained by the carrier. XCC concrete 305 may be considered as a bridge which connects XCC framework 304 and carrier's backend system 303. If carrier's backend system 303 provides the RSS service, the carrier may implement a business method corresponding to the RSS service, for example, as follows:

XCCRSSResponse executeRSS(XCCRSSReqeust)

The class which defines method executeRSS is inherited (e.g., overloading and/or virtualization) from the class which defines method executeRSS in XCC framework 304, so the method executeRSS would have exactly the same interface as executeRSS in XCC framework 304.

Figure 4B:
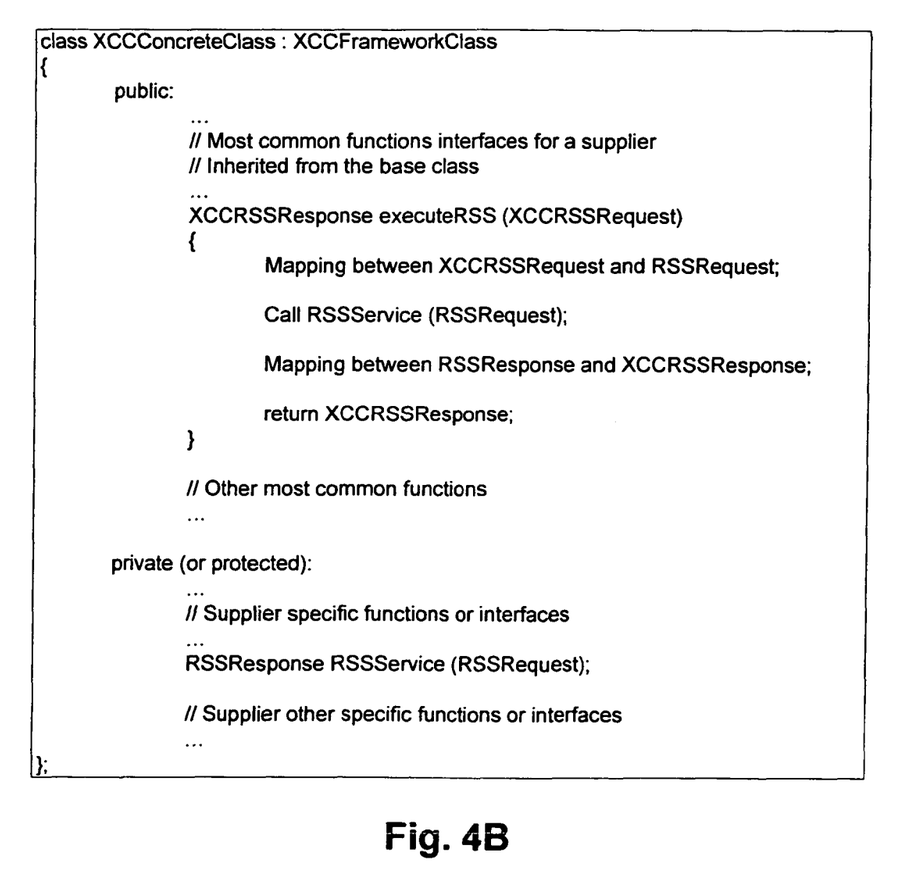

FIGS. 4A and 4B are examples of pseudo code illustrating class definition structures according to certain embodiments of the invention. Referring to FIGS. 4A and 4B, suppose the method providing RSS service in carrier's backend system is RSSResposne RSSService(RSSRequest)

Here RSSRequest is an input parameter and RSSResponse is an output parameter. RSSRequest and RSSResponse constitute the carrier's private interface, and usually this interface is different from ERP company's universal interface (e.g., XCCRSSRequest and XCCRSSResponse).

Figure 5:
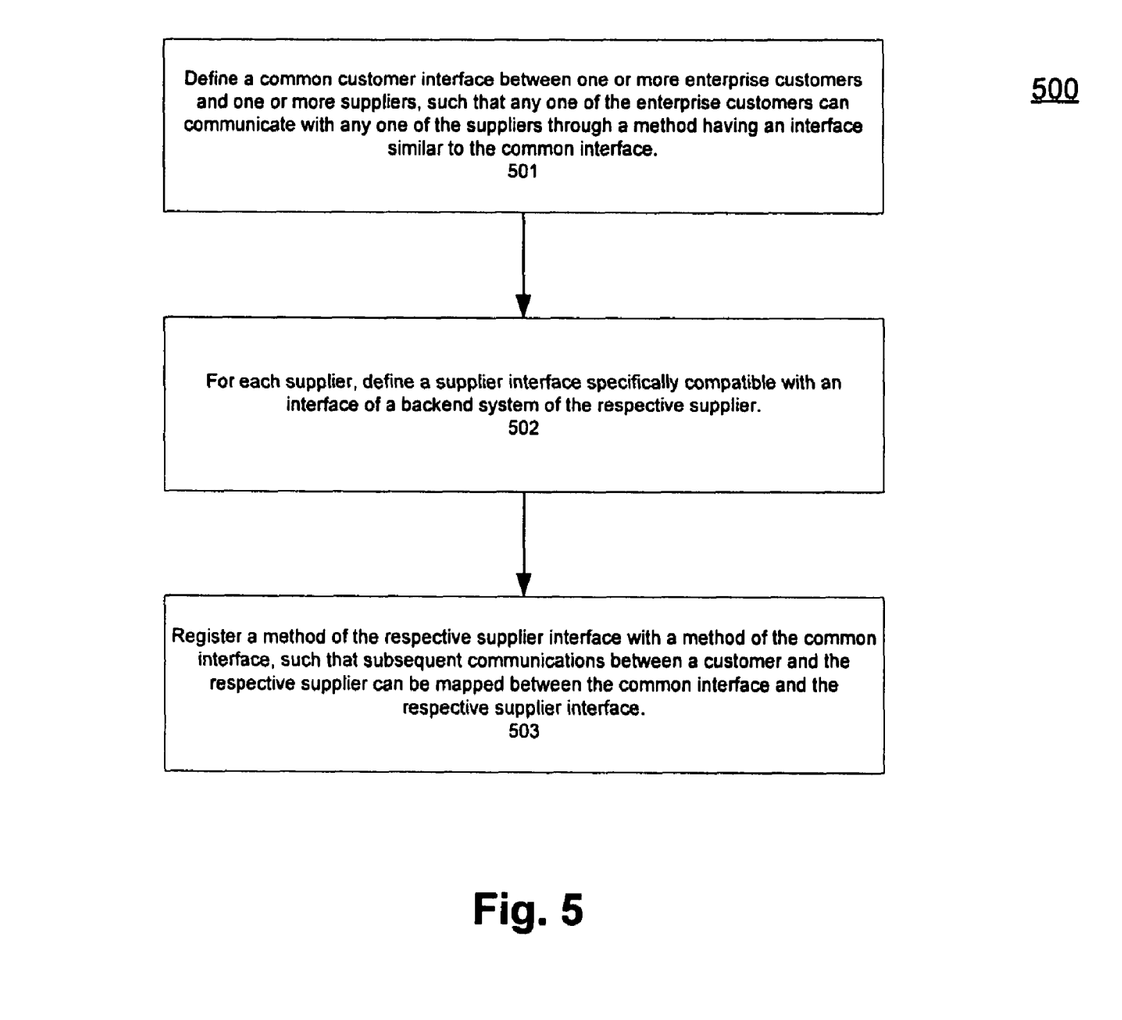
FIG. 5 is a flow diagram illustrating an example of a process for registering a service of a supplier, according to one embodiment of the invention.

The run time logic of business method executeRSS in XCC concrete, as illustrated in FIG. 4B, according to one embodiment, may be described as follows:

1. Implement the message mapping from XCCRSS-Reqeust to RSSReqeust
2. Call carrier's backend system method RSSService, get the response RSSResposne
3. Implement the mapping from RSSResposne to XCCRSSResponse
4. Return the XCCRSSResponse to XCC Framework FIG. 5 is a flow diagram illustrating an example of a process for registering a service of a supplier, according to one embodiment of the invention. Exemplary process 500 may be performed by a processing logic that may include hardware (circuitry, dedicated logic, etc.), software (such as is run on a dedicated machine), or a combination of both. For example, process 500 may be performed by supplier connect 302 of FIG. 3, an ERP system vendor (e.g., ERP system 301 of FIG. 3), supplier 303 (and/or its administrator 308) of FIG. 3, or a combination of these parties. In a specific embodiment, process 500 may be performed by registry application 306 of supplier connect framework 304 via service registry interface 307 of FIG. 3, for example, under instructions of supplier administrator or IT (information technology) manager 308.

Referring to FIG. 5, at processing block 501, processing logic defines a common customer interface between one or more enterprise customers (e.g., enterprise customer 301 of FIG. 3) and one or more suppliers (e.g., supplier 303 of FIG. 3), such that any one of the enterprise customers can communicate with any one of the suppliers through a method having an interface similar to the common interface (e.g., similar to those interfaces defined in FIGS. 4A and 4B).

The common interface (also referred to as a first interface with respect to a supplier connect) may be defined and maintained by an ERP vendor that develops an ERP system for an enterprise customer such as enterprise customer/ERP system 301 of FIG. 3. In one embodiment, such an interface may include an interface defined for framework Web service 310 of FIG. 3, framework application 311 of FIG. 3, or a combination of both.

At processing block 502, for each of the one or more suppliers, processing logic defines a supplier interface (also referred to as a second interface with respect to a supplier connect) that is specifically defined in view of an interface of a backend system of the respective supplier (e.g., a carrier's backend system). The supplier interface is defined dependent upon the specific interface of the backend system of the respective supplier.

At processing block 503, processing logic registers a method of a respective supplier interface with a method of a common interface, such that subsequent communications between an enterprise customer and a supplier associated with the registered supplier interface can be mapped between the common interface and the respective supplier interface. The information regarding the registered methods/interfaces may be stored within a corresponding supplier connect associated with the respective supplier, such as, for example, service registry 309 of FIG. 3. If the registered method or methods are implemented in a Java environment, the information stored in the service registry may include, but is not limited to, service name, vendor name, application name, JAR name, and/or JND1, etc. However, other object oriented environments, such as, for example, the .NET framework available from Microsoft, may also be utilized. Other operations may also be performed.

Figure 6:
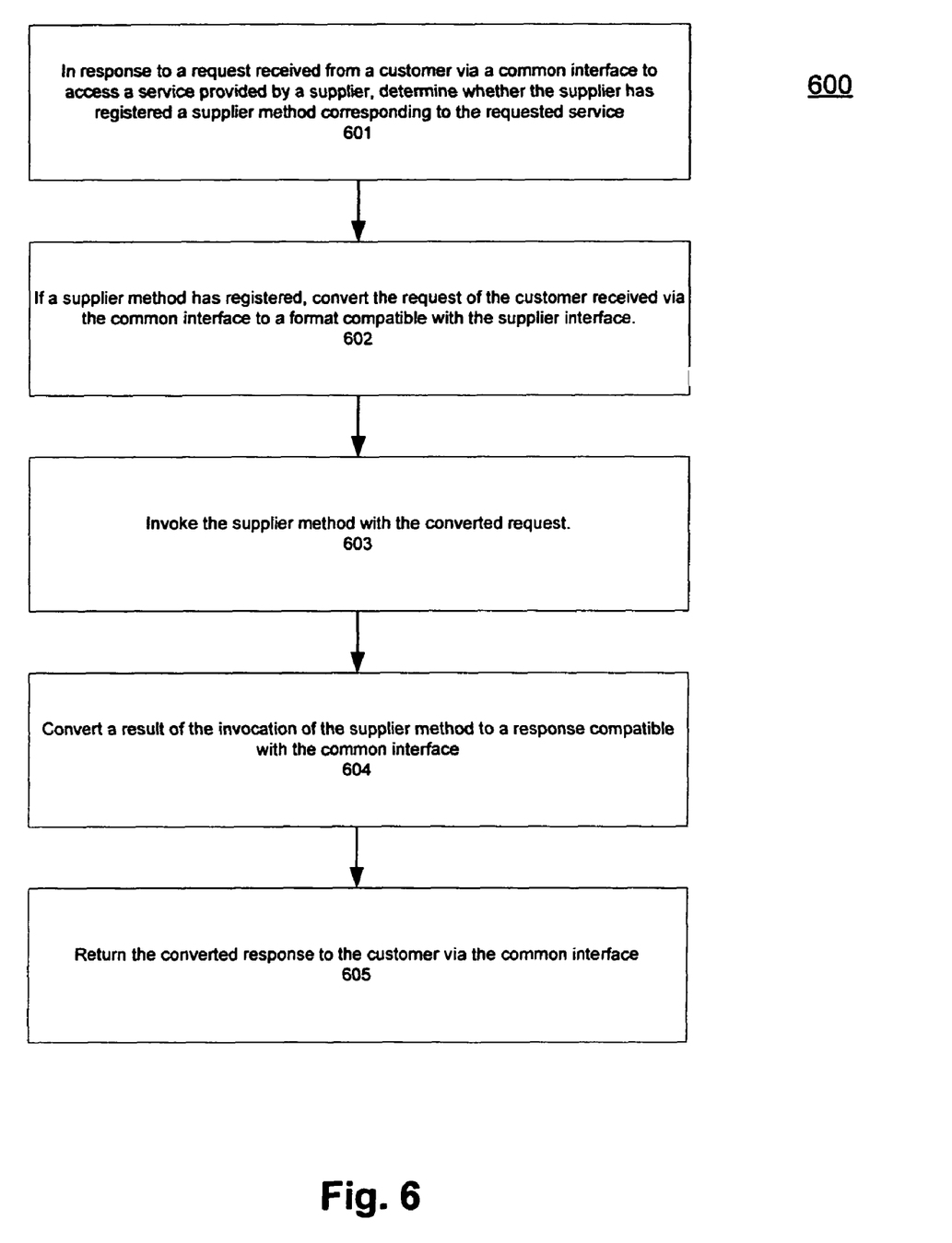
FIG. 6 is a flow diagram illustrating an example of a process for interfacing an enterprise customer with a supplier, according to one embodiment of the invention.

FIG. 6 is a flow diagram illustrating an example of a process for interfacing an enterprise customer with a supplier, according to one embodiment of the invention. Exemplary process 600 may be performed by a processing logic that may include hardware (circuitry, dedicated logic, etc.), software (such as is run on a dedicated machine), or a combination of both. For example, process 600 may be performed by supplier connect 302 of FIG. 3, supplier 303 (and/or its administrator 308) of FIG. 3, or a combination of these parties. In a specific embodiment, process 600 may be performed by connect framework 304 and/or connect concrete 305 of supplier connect 302 of FIG. 3.

In one embodiment, process 600 includes, but is not limited to, in response to a request received from an enterprise customer via a first interface (e.g., a common or universal interface) over a network (e.g., Internet) for a service provided by a supplier, mapping the request from a first format compatible with the first interface to a second format compatible with a second interface coupling with a backend system of the supplier, and invoking a method of the backend system of the supplier via the second interface (e.g., supplier specific interface) to provide the requested service to the enterprise customer using information of the mapped request, where the first interface is compatible with the requesting customer and the second interface is a specific interface to the backend system of the supplier, and where functionality of mapping and the second interface are maintained by the supplier.

Referring to FIG. 6, in response to a request received from a customer via a common interface (e.g., first interface) to access a service provided by a supplier, at block 601, processing logic determines whether the supplier has registered a supplier method corresponding to the requested service. In one embodiment, this operation may be performed by framework application 311 of FIG. 3. In a particular embodiment, the processing logic looks up in a database or storage (e.g., service registry 309 of FIG. 3) to determine whether such a method of a supplier has been registered. As described above, if a method has been registered, certain information (e.g., service name, vendor name, application name, JAR name, and/or JNDI of a Java application) may have been stored in the database.

At block 602, if a supplier method has been registered, the processing logic converts or maps the request of the customer received via the common interface to a format compatible with the supplier interface. In one embodiment, this operation may be performed by a connect concrete, such as connect concrete 305 of supplier connect 302 of FIG. 3. In response to the mapping operation set forth above, at block 603, the processing logic invokes the supplier method using the converted or mapped request. Likewise, once the result of the invoked method is returned, at block 603, the processing logic may convert or map the result of the invocation of the supplier method to a response compatible with the common interface and, at block 605, the converted or mapped response is returned back to the calling customer via the common interface. Other operations may also be performed.

Figure 7:
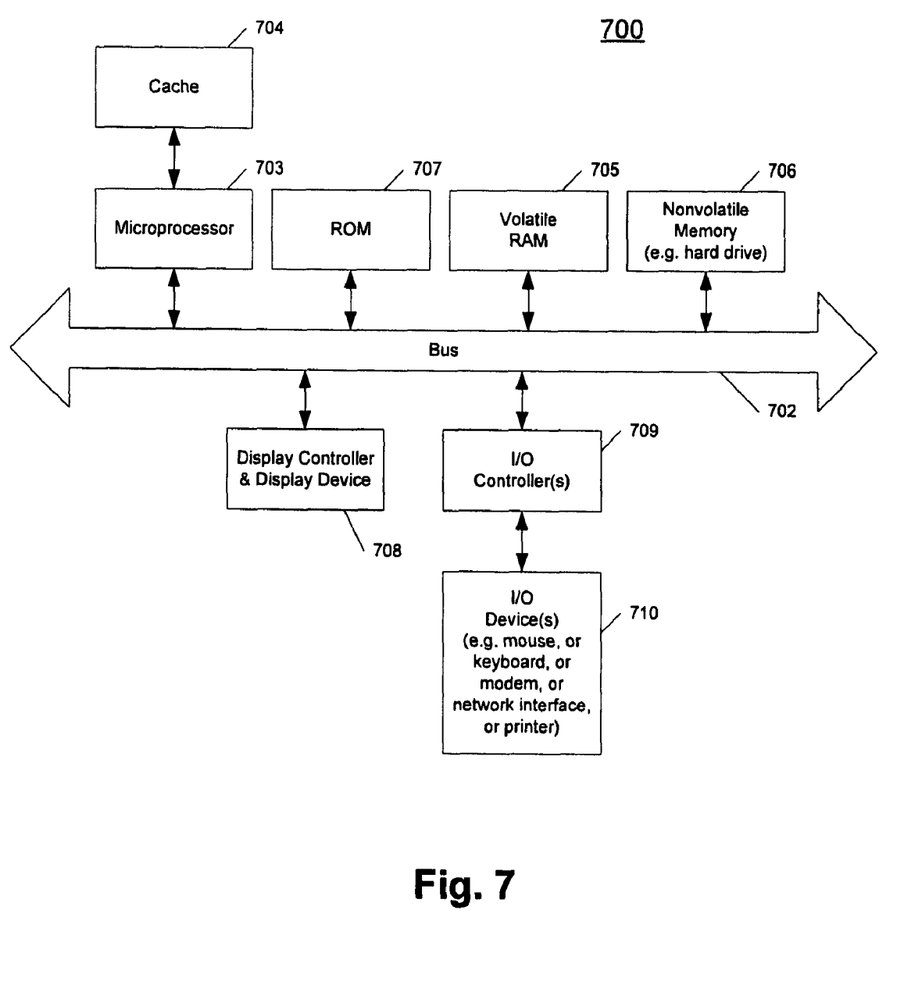
FIG. 7 is a block diagram illustrating a data processing system which may be used with an embodiment of the invention.

FIG. 7 is a block diagram of a data processing system, which may be used with one embodiment of the invention. For example, the system 700 shown in FIG. 7 may be used as an enterprise computing system, such as, for example, enterprise customers 201-202 of FIG. 2A. Alternatively, system 700 may be implemented as part of a supplier system, such as, for example, systems 204-205 and/or 206-207. In one embodiment, system 700 may include sufficient software, hardware, or a combination of both, to implement embodiments of the invention set forth above and/or perform operations set forth in FIGS. 5-6.

Note that while FIG. 7 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 7 may, for example, be a J2EE compatible system or a .NET framework compatible system.

As shown in FIG. 7, the computer system 700, which is a form of a data processing system, includes a bus 702 which is coupled to a microprocessor 703 and a ROM 707, a volatile RAM 705, and a non-volatile memory 706. The microprocessor 703, which may be a PowerPC microprocessor from Motorola, Inc. or IBM, is coupled to cache memory 704 as shown in the example of FIG. 7. Alternatively, processor 703 may be a Pentium Processor from Intel Corporation. Other processors may also be utilized.

The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art. Typically, the input/output devices 710 are coupled to the system through input/output controllers 709.

The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically the non-volatile memory will also be a random access memory, although this is not required.

While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals.

Thus, methods and apparatuses for interfacing enterprise customers and suppliers have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc. The electrical, optical, acoustical or other form of propagated signals sometimes are also referred to as part of a transmission or transport medium.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method for interfacing an enterprise customer and a supplier, the method comprising:
   via first interface at a supplier connect component of the supplier that provides a service, receiving over the Internet a request for the service from an enterprise resource planning (ERP) system associated with the enterprise customer;
   mapping the request from a first format compatible with the first interface to a second format compatible with a second interface of the supplier connect component interfacing with a backend system of the supplier;
   invoking a method of the backend system of the supplier via the second interface to provide the requested service to the enterprise customer responsive to the mapped request;
   in response to a result of the invocation of the method of the backend system via the second interface, mapping the result of the invocation to a response compatible with the first format of the first interface, wherein the first format of the first interface is designed by a vendor of the ERP system and the second format of the second interface is designed and developed by the supplier, wherein functionality of mapping and the second interface are developed and maintained by the supplier;
   returning the response to the enterprise customer via the first interface over the Internet;
   implementing the first interface as a first public function member of a base class in an object-oriented programming environment and the second interface is implemented as a private function member of a derived class that is derived from the base class, wherein the derived class includes a second public function member that overloads the first public member to interface with the ERP system, and wherein the second public function is configured to invoke a mapping function for mapping between the first and second formats and to invoke the method by calling the private function member of the derived class.

2. The method of claim 1, further comprising determining whether the method of the backend system of the supplier has been previously registered prior to the invocation of the method, wherein the method is only invoked when the method has been registered previously.

3. The method of claim 2, further comprising:
   looking up in a registry table based on an identity of the requested service to determine whether the method has been registered, wherein the registry table is maintained by the supplier; and
   if the method has been registered, determining location information of the method, wherein the method is invoked based on the location information.

4. The method of claim 1, wherein the enterprise customer is not aware of the second interface maintained by the supplier.

5. The method of claim 4, wherein an update on the second interface by the supplier is performed without having to notify the enterprise customer and the first interface remains the same.

6. The method of claim 1, wherein the supplier is a first supplier, wherein the enterprise customer is capable of accessing a second supplier different than the first supplier using a second request having a format compatible with the first interface.

7. The method of claim 6, wherein the second supplier is configured to map the second request to a format compatible with a third interface specifically designed for a backend system of the second supplier, and wherein the third interface of the second supplier is different than the second interface of the first supplier.

8. A non-transitory machine-readable medium having instructions, when executed, cause a machine to perform a method for interfacing an enterprise customer and a supplier, the method comprising:
   via first interface at a supplier connect component of the supplier that provides a service, receiving over the Internet a request for the service from an enterprise resource planning (ERP) system associated with the enterprise customer;

mapping the request from a first format compatible with the first interface to a second format compatible with a second interface of the supplier connect component interfacing with a backend system of the supplier;

invoking a method of the backend system of the supplier via the second interface to provide the requested service to the enterprise customer responsive to the mapped request;

in response to a result of the invocation of the method of the backend system via the second interface, mapping the result of the invocation to a response compatible with the first format of the first interface, wherein the first format of the first interface is designed by a vendor of the ERP system and the second format of the second interface is designed and developed by the supplier, wherein functionality of mapping and the second interface are developed and maintained by the supplier;

returning the response to the enterprise customer via the first interface over the Internet;

implementing the first interface as a first public function member of a base class in an object-oriented programming environment and the second interface is implemented as a private function member of a derived class that is derived from the base class, wherein the derived class includes a second public function member that overloads the first public member to interface with the ERP system, and wherein the second public function is configured to invoke a mapping function for mapping between the first and second formats and to invoke the method by calling the private function member of the derived class.

9. The non-transitory machine-readable medium of claim 8, wherein the method further comprises determining whether the method of the backend system of the supplier has been previously registered prior to the invocation of the method, wherein the method is only invoked when the method has been registered previously.

10. The non-transitory machine-readable medium of claim 9, wherein the method further comprises:

looking up in a registry table based on an identity of the requested service to determine whether the method has been registered, wherein the registry table is maintained by the supplier; and if the method has been registered, determining location information of the method, wherein the method is invoked based on the location information.

11. The non-transitory machine-readable medium of claim 8, wherein the enterprise customer is not aware of the second interface maintained by the supplier.

12. The non-transitory machine-readable medium of claim 11, wherein an update on the second interface by the supplier is performed without having to notify the enterprise customer and the first interface remains the same.

13. The non-transitory machine-readable medium of claim 8, wherein the supplier is a first supplier, wherein the enterprise customer is capable of accessing a second supplier different than the first supplier using a second request having the same format compatible with the first interface.

14. The non-transitory machine-readable medium of claim 13, wherein the second supplier is configured to map the second request to a format compatible with a third interface specifically designed for a backend system of the second supplier, and wherein the third interface of the second supplier is different than the second interface of the first supplier.

15. An apparatus for interfacing an enterprise customer and a supplier, comprising:

a connect framework having a first interface to receive a request from an enterprise customer as part of a Web service over Internet requesting for a service provided by a supplier; and a connect concrete coupled to the connect framework, the connect concrete having a second interface coupled with a backend system of the supplier;

wherein in response to the request, the connect concrete is configured to map the request from a first format compatible with the first interface to a second format compatible with the second interface, and to invoke a method of the backend system of the supplier via the second interface to provide the requested service to the enterprise customer using information of the mapped request, wherein functionality of the connect concrete is developed and maintained by the supplier, wherein the first format is designed by a vendor of the system and the second format is designed and developed by the supplier;

wherein in response to a result of the invocation of the method received from the backend system via the second interface, the connect concrete is configured to map the result to a response compatible with the first format of the first interface and to return the response to the enterprise customer via the first interface of the connect framework; and implementing the first interface as a first public function member of a base class in an object-oriented programming environment and the second interface is implemented as a private function member of a derived class that is derived from the base class, wherein the derived class includes a second public function member that overloads the first public member to interface with the ERP system, and wherein the second public function is configured to invoke a mapping function for mapping between the first and second formats and to invoke the method by calling the private function member of the derived class.

16. The apparatus of claim 15, wherein the connect framework is configured to determine whether the method of the backend system of the supplier has been previously registered prior to the invocation of the method, wherein the method is only invoked when the method has been registered previously.

17. The apparatus of claim 16, wherein the connect framework is configured to look up in a registry table based on an identity of the requested service to determine whether the method has been registered, wherein the registry table is maintained by the supplier, wherein if the method has been registered, the connect framework is configured to determine location information of the method, and wherein the method is invoked based on the location information.

* * * * *